UNITED STATES PATENT OFFICE 1,990,737

MANUFACTURE OF RUBBER BONDED ABRASIVE PRODUCTS

Joseph N. Kuzmick and Joseph A. Lange, Passaic, N. J., assignors to Raybestos-Manhattan, Inc., Passaic, N. J., a corporation of New Jersey No Drawing. Application February 5, 1934, Serial No. 709,792

14 Claims. (Cl. 51—278)

This invention relates to the manufacture of rubber bonded abrasive products.

The prime object of the present invention is to produce abrasive articles, particularly grinding wheels, of an open and porous structure and of maximum strength and cutting ability, wherein rubber is used as a binder in such a manner as to obtain products of superior quality and usefulness.

The bulk of hard rubber bonded abrasive wheels of the prior art is made by first compounding crude rubber with an appropriate amount of sulphur on mixing or differential rolls. In the compounding or mixing operation small increments of abrasive particles or granules are added until a desired amount of abrasive is absorbed by the rubber binder. Abrasive articles such as grinding wheels are then formed by rolling the mixture of rubber, sulphur, and abrasive granules into a sheet of the required thickness, by cutting out portions of suitable shape therefrom and by then subjecting the same to heat and pressure.

Abrasive wheels made by this method have decided limitations. The abrasive particles are broken down by the crushing action of the mixing rolls and the original size of the abrasive grains is thus destroyed. This crushing action is so pronounced and the original abrasive particles so broken down that in an ordinary mix but 20% of particles of the selected size remains, the balance being broken down into various smaller sizes, even producing abrasive flour. The resulting structure of an abrasive product made by this roll mixing process is inherently dense and non-porous, and its cutting efficiency is impaired as compared with a wheel having the same proportion of abrasive to rubber binder but in which the abrasive particles are not broken down. While this resulting dense product has certain specific applications, its field of adaptability is limited. This density is particularly objectionable in grinding wheels also because considerable heat is generated at the grinding contact surface and objectionable odor of burning rubber is produced with this generation of heat. From a manufacturing standpoint, a further objection to the roll mixed process is that the mixed stock must be produced in slab form, from which the desired shapes such as circular disks are cut or punched. It is obvious that after the disks are cut or punched out of the slab there is a considerable amount of stock left in the slab which must be reworked or discarded as waste. Furthermore, in general practice, slabs of mixed stock greater than two inches in thickness are not practicable; and if it is desired to obtain abrasive products thicker than this, they must therefore be built up of several plies.

We have found that these disadvantages inherent in prior art methods may be obviated by producing a liquid or plastic rubber which may be compounded with the abrasive grains in an improved manner. To accomplish this, we have discovered a method of changing the physical state of crude rubber to a liquid or plastic state having a consistency comparable to that of heavy molasses, without the use of rubber solvents, etc. The rubber remains in this plastic state indefinitely at ordinary temperatures and pressures; and it is possible, with the use of proper vulcanizing and compounding agents, to vulcanize this rubber with heat to various degrees of hardness. This rubber can be mixed with various proportions of abrasives, fillers, vulcanizing and compounding agents, natural and synthetic resins, in paddle or dough mixers, thus eliminating the crushing action encountered in the ordinary roll mixing procedure. The resulting mix is of a plastic or doughlike consistency and remains so indefinitely at ordinary temperatures; and this mix can be readily formed and molded into shapes of any desired size and form. Articles manufactured from this material can be vulcanized to various degrees of hardness in the same manner as are ordinary rubber compounds.

The use of rubber solvents for producing doughlike masses of rubber and abrasive mixtures is known; but this, besides being extensive, requires additional treatment of the mixed mass to remove all of the solvent. It has further been found that the extraction of such solvents is detrimental to the binding efficiency of the rubber in the finished abrasive product. Rubber latex has also been used for the production of doughlike masses of rubber-abrasive mixtures. This, however, suffers several disadvantages, one being the necessity of removing water after coagulation, and another being that it is difficult to procure latex of uniform solid content, which is necessary for the maintenance of specific proportions of rubber to abrasives, etc.

To change the physical state of crude rubber to the liquid or plastic state referred to, we have found that we may add to or incorporate with the crude rubber, after milling treatment, a liquefying agent of such nature that when the mix of the rubber and liquefying agent is subjected to heat at relatively high temperatures, liquefaction of the rubber takes place. The liquefying agent is then expelled preferably under the heat conditions attained during liquefaction and preferably at the end of the heating cycle, thereby producing a rubber which is liquid or pourable at ordinary temperatures and pressures and which is substantially free of the liquefying agent. This liquid rubber may then be mixed with the abrasive granules and other compounding agents in an ordinary paddle mixer, the integrity of the abrasive granules being thereby maintained and said abrasive granules being coated or encapsuled in the process by the liquid rubber which forms a bond therefor.

The liquefying agent which we have found best adapted to the purpose is naphthalene, preferably in the form of flakes. The rubber and the naphthalene are intimately mixed, this mixing being done on the usual mixing rollers, although it is obvious the same may be carried out in various ways. The resulting rubber-naphthalene mix is then subjected to temperatures sufficient to cause the liquefaction; these temperatures may vary considerably, depending upon the character of the liquefying agent used, but with naphthalene the necessary temperature is ordinarily found to be between 200° and 350° C., temperatures of 500°–600° F. being preferred. After liquefaction, the naphthalene is expelled by permitting the same to boil off or sublime under the heat conditions attained during liquefaction. The resulting rubber which is obtained on cooling to normal temperature assumes a state of liquidity or plasticity uniform throughout and comparable with heavy molasses and remains thus indefinitely.

The device which we prefer to use for producing this liquid or plastic state of rubber consists of an ordinary screw-feed type tubing machine, to which is attached a heating die, consisting of an inner and outer steel tube; the tubes are self-supported with relation to each other, so as to be held coaxial and rigid. They are of such relative dimensions that when mounted in their proper positions there is an annular space between them. It is through this annular space that the rubber-naphthalene mixture is forced by the action of the screw in the tube machine. The outer tube can be heated by any convenient method which will elevate the temperature of the rubber-naphthalene mixture passing through between the tubes to preferably 500°–600° F. The length of the heating member and the thickness of the annular space between the tubes may be varied, but it is important that the thickness of the section of rubber-naphthalene mixture be relatively small. We have found it convenient to make the heating die approximately 30" long and of such diameters as to leave an opening ⅛" thick between the inner and outer tube. The heating of said die is desirably accomplished by winding electrical resistance wire around and insulated from the outer tube.

In operation, the speed of the feed is determined so that the rubber-liquefying agent mix is exposed to the heat for a sufficient length of time to obtain the result sought. The mix discharges from the machine in a bubbling liquid state, the naphthalene readily boiling off or subliming from the mass. The naphthalene or other liquefying agent is recovered in the process for further use. We have found that the resulting liquid or plastic rubber is free of the naphthalene except for possible traces, as for example of the order of ⅛th of 1%. The character of the liquid rubber thus obtained makes it therefore suitable for the manufacture of grinding wheels where a proper dynamic balance is desired to be obtained.

In selecting a liquefying agent to be mixed with the rubber, the substance chosen should be a material which has a pronounced plasticizing effect on the rubber at elevated temperatures; and, inasmuch as it is not desirable for any of the liquefying material to remain in the rubber mass after completion of the heating cycle, the material should be one that volatilizes, sublimes or boils off at the temperature attained in the melting die. Naphthalene fulfills these requirements, and because of its relatively low cost and availability, it has been preferably used, but other liquefying agents may be used instead, although to lesser advantage. Thus, anthracine or benzene have properties which permit of their substitution for naphthalene.

In compounding the rubber-naphthalene mix, we prefer to use 3 to 10% by weight of naphthalene on the rubber. We have found, however, that satisfactory products can be made with as much as 20% of naphthalene on the rubber.

An example of the use of this liquid or plastic rubber produced by the above outlined procedure in making an abrasive article is as follows:—

| | Parts by weight |
|---|---|
| Liquid or plastic rubber | 16 |
| Sulphur | 8 |
| Litharge | 4 |
| Abrasive, aluminous, #16 mesh | 192 |

The above ingredients are charged into a mixer of the paddle or beater type, e. g. a dough mixer, and allowed to mix until a uniform consistency is obtained. The mixed mass is of plastic or doughlike consistency at ordinary temperature. This mass is then uniformly distributed in a mold of suitable size and shape and subjected to pressure consistent with the density required, the pressing being performed without applying heat. The pressed abrasive article is then cured to the desired degree of hardness in an oven or steam vulcanizer. The abrasive articles may also be pressed and cured simultaneously in a suitable hot press.

The advantages of an abrasive article, such as a grinding wheel, made by this process as compared to a similar product made by the previous known methods are:—

1. Maintenance of sharpness and original size of abrasive entering into the mixture, resulting in wheels of more efficient cutting ability and marked reduction in odor of burning rubber due to the inherent cool cutting action of this improved type of grinding wheel.

2. Ability to produce various degrees of porosity heretofore impossible with the process employing rolls for mixing the ingredients.

3. Improved grinding efficiency due to greater adhesion between the rubber binder and abrasive grains; the liquid or plastic rubber effectively coats the abrasive particles when these are mixed.

4. Simplicity of molding with uniform distribution of mixed stock in production of rubber bonded abrasive articles of complex shapes.

We have found that the characteristics of an abrasive article made in accordance with the above outlined procedure may be varied by the addition of organic and inorganic accelerators and fillers, such as Silex, metallic oxides, clays, sulphates, etc., the selection of the kind and amount of such materials added being determined by the characteristics desired in the finished article.

We have further found that the addition of from 6 to 50% by weight of the rubber, of natural or synthetic resins such as shellac, or phenol formaldehyde, furfural, resorcinol, and alkyd types of synthetic resins, is advantageous in increasing the tensile strength of the abrasive article for a given porosity. An example of this practice is as follows:

|  | Parts by weight |
| --- | --- |
| Liquid or plastic rubber | 3 |
| Synthetic resin | 1 |
| Sulphur | 1½ |
| Aluminous oxide or silicon carbide | 80 |

These ingredients are charged into a mixer of the paddle or heater type and allowed to mix until a uniform consistency is obtained. The liquid rubber thoroughly coats and encapsules all of the abrasive grains and also forms a vehicle for the sulphur and the synthetic resin. The mass of doughlike consistency obtained is readily formed in molds and vulcanized. The vulcanization takes place at about 320 to 330° F. for a period of from 10 to 20 hours, depending upon the size of the product being made.

We claim:

1. The method of making an abrasive product which consists in incorporating a liquefying agent with rubber, subjecting the same to heat at relatively high temperatures producing thereby the liquefaction of the rubber, boiling off the liquefying agent under the heat conditions attained during liquefaction producing thereby a liquid rubber substantially free of the liquefying agent, and in then mixing the liquid rubber with abrasive particles to coat the abrasive particles and to form a bond therefor.

2. The method of making an abrasive product which consists in incorporating a liquefying agent with rubber, subjecting the same to heat at relatively high temperatures and producing thereby the liquefaction of the rubber, expelling the liquefying agent and producing thereby a liquid rubber substantially free of the liquefying agent, and in then mixing the liquid rubber with abrasive particles to coat the abrasive particles and to form a bond therefor.

3. The method of making an abrasive product which consists in incorporating a liquefying agent with rubber, subjecting the same to heat at temperatures of 200°–350° C. producing thereby the liquefaction of the rubber, then expelling the liquefying agent producing thereby a liquid rubber substantially free of the liquefying agent, and in then mixing the liquid rubber with abrasive particles to coat the abrasive particles and to form a bond therefor.

4. The method of making an abrasive product which consists in incorporating a liquefying agent with rubber, subjecting the same to heat at temperatures of 200°–350° C. producing thereby the liquefaction of the rubber, boiling off the liquefying agent under the heat conditions attained during liquefaction producing thereby a liquid rubber substantially free of the liquefying agent, and in then mixing the liquid rubber with abrasive particles to coat the abrasive particles and to form a bond therefor.

5. The method of making an abrasive product which consists in incorporating napththalene with rubber, subjecting the same to heat at relatively high temperatures producing thereby the liquefaction of the rubber, and in mixing the liquefied rubber with abrasive particles to coat the abrasive particles and to form a bond therefor.

6. The method of making an abrasive article such as an abrasive wheel which consists in incorporating a liquefying agent with rubber, subjecting the same to heat at relatively high temperatures and expelling the liquefying agent producing thereby a liquid rubber substantially free of the liquefying agent, in then mixing the liquid rubber with a vulcanizing agent and with abrasive particles, the liquid rubber coating the abrasive particles and forming a bond therefor, and in then shaping and curing the mix.

7. The method of making an abrasive article such as an abrasive wheel which consists in incorporating naphthalene with rubber, subjecting the same to heat at relatively high temperatures and producing thereby a liquefaction of the rubber, in then mixing the liquefied rubber with a vulcanizing agent and with abrasive particles, the liquefied rubber coating the abrasive particles and forming a bond therefor, and in then shaping and curing the mix.

8. The method of making an abrasive article such as an abrasive wheel which consists in incorporating naphthalene with rubber, subjecting the same to heat at temperatures of 200° to 350° C. and in expelling the liquefying agent at the end of the heat treatment producing thereby a liquid rubber substantially free of the liquefying agent, in then mixing the liquid rubber with a vulcanizing agent and with abrasive particles, the liquid rubber coating the abrasive particles and forming a bond therefor, and in then shaping and curing the mix.

9. The method of making an abrasive article such as an abrasive wheel which consists in incorporating a liquefying agent with rubber, subjecting the same to heat at relatively high temperatures and effecting thereby liquefaction of the rubber, expelling the liquefying agent under the heat conditions attained during liquefaction and at the end of the heat treatment producing thereby a liquid rubber substantially free of the liquefying agent, in then mixing the liquid rubber with a vulcanizing agent and with abrasive particles, the liquid rubber coating the abrasive particles and forming a bond therefor, and in then shaping and curing the mix.

10. The method of making an abrasive product which consists in incorporating a liquefying agent with rubber, subjecting the same to heat at relatively high temperatures and producing thereby the liquefaction of the rubber, expelling the liquefying agent and producing thereby a liquid rubber substantially free of the liquefying agent, and in then mixing the liquid rubber with abrasive particles, synthetic resin and a vulcanizing agent.

11. The method of making an abrasive product which consists in incorporating naphthalene with rubber, subjecting the same to heat at relatively high temperatures and producing thereby the liquefaction of the rubber, and in then mixing the liquefied rubber with abrasive particles, synthetic resin and a vulcanizing agent.

12. The method of making an abrasive product which consists in incorporating naphthalene with rubber, subjecting the same to heat at relatively high temperatures producing thereby the liquefaction of the rubber, expelling the naphthalene and producing thereby a liquid rubber, and in then mixing the liquid rubber with abrasive particles, synthetic resin and a vulcanizing agent.

13. The method of making an abrasive article such as an abrasive wheel which consists in incorporating a liquefying agent with rubber, subjecting the same to heat at relatively high temperatures producing thereby the liquefaction of the rubber, in then mixing the liquid rubber with abrasive particles, synthetic resin and a vulcanizing agent, and in then molding and curing the mix to the shape desired.

14. The method of making an abrasive article such as an abrasive wheel which consists in incorporating naphthalene with rubber, subjecting the same to heat at relatively high temperatures and in then expelling the naphthalene producing thereby a liquid rubber, in then mixing the liquid rubber with a vulcanizing agent, synthetic resin and abrasive particles, and in then molding and curing the mix to the shape desired.

JOSEPH N. KUZMICK.
JOSEPH A. LANGE.